United States Patent Office 3,066,164
Patented Nov. 27, 1962

3,066,164
PREPARATION OF ORGANIC CARBAMATE COMPOUNDS
Robert H. Sifferd, Joliet, and Leo D. Braitberg, Park Forest, Ill., assignors, by mesne assignments, to Armour-Pharmaceutical, a corporation of Delaware
No Drawing. Filed May 29, 1959, Ser. No. 816,700
5 Claims. (Cl. 260—482)

This invention relates to the preparation of organic carbamate compounds, and more particularly to an improved method of preparing carbamate derivatives of 1,2 glycols.

The organic carbamate compounds have been found to be useful as tranquilizers and sedatives. Some of these compounds are currently being marketed for this purpose and others are undergoing intensive clinical evaluation. Consequently, there is a need for improved methods of manufacturing mono and dicarbamate compounds on a commercial scale, so that they may be made available to the considerable number of patients requiring tranquilizer or sedative therapy.

The conventional method of preparing organic carbamate compounds is described in British Patent No. 689,705, issued April 1, 1953, and in U.S. Patent No. 2,656,378, issued October 20, 1953, to F. M. Berger and B. J. Ludwig, wherein the cyclic carbonate derivative of a glycol is subjected to ammonolysis with ammonia or a primary or secondary amine to obtain the monocarbamate corresponding to such cyclic carbonate. The cyclic carbonate employed in this ammonolysis reaction is conventionally produced by condensing phosgene (carbonyl chloride) with a glycol to form the corresponding ester, which is obtained as a heterocyclic ring structure (see U.S. Patent No. 2,656,378). Although suitable for the preparation of laboratory quantities of organic compounds for testing, this method cannot be efficiently adapted to the large scale manufacture of organic carbamate compounds for widespread therapeutic use.

Accordingly, it is a general object of this invention to provide a method which can be readily adapted to the large scale manufacture of organic carbamate compounds in high yield and purity. A particular object is to provide a method which is especially applicable to the large scale manufacture of monocarbamate derivatives of 1,2 glycols. Other objects and advatages will become apparent as the specification proceeds.

In one aspect of this invention organic carbamate compounds can be prepared by condensing a glycol and a halo-formic ester to obtain the corresponding acyclic carbonate, and subjecting such acyclic carbonate to ammonolysis in aqueous medium with a water-soluble organic ammonium compound to produce the corresponding monocarbamate. That is, there is condensed according to this invention a glycol having the formula

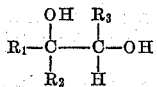

wherein $R_1$ is a radical selected from the group consisting of aromatic, heterocyclic and alicyclic radicals and aliphatic and substituted aliphatic radicals containing less than 11 carbon atoms, wherein $R_2$ is selected from the group consisting of hydrogen, heterocyclic, aromatic and alicyclic radicals and alkyl and substituted aliphatic radicals containing less than 11 carbon atoms, and wherein $R_3$ is hydrogen or an aliphatic radical containing less than 11 carbon atoms, and a halo-formic ester having the formula

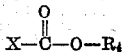

wherein X is halogen selected from the group consisting of chlorine, bromine and fluorine, and wherein $R_4$ is an alkyl radical containing less than 5 carbon atoms, to obtain the corresponding acyclic carbonate, and such acyclic carbonate is subjected to ammonolysis with a water-soluble compound selected from the group consisting of ammonia and amines containing at least one available hydrogen atom attached to the nitrogen atom to produce the corresponding monocarbamate. In the foregoing procedure the intermediate acyclic carbonate has the formula

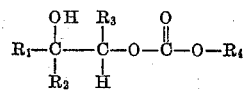

in which the substituents $R_1$ to $R_4$ are as hereinbefore described. Furthermore, the organic monocarbamate compounds obtained by this process have the formula

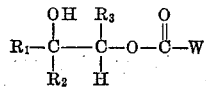

in which the substituents $R_1$ to $R_3$ are as hereinbefore described, and in which W represents an amino or substituted amino group. Better results are obtained when, in the foregoing formulae, $R_1$ is an aromatic radical, $R_2$ is hydrogen or an aromatic radical, and $R_3$ is hydrogen or an alkyl radical containing less than 6 carbon atoms. Still better results are achieved when, also in the foregoing formulae, the amino group is derived from a water-soluble compound selected from the group consisting of heterocyclic amines having at least one available hydrogen and compounds having the formula $NH(R_5)_2$, in which $R_5$ is hydrogen or an alkyl radical containing less than 4 carbon atoms or mixtures thereof.

In another aspect of this invention there is formed a monocarbamate derivative of a 1,2 glycol by condensing ethylchloroformate and a 1,2 glycol having the formula

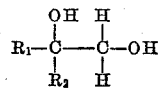

wherein $R_1$ is an aromatic radical and wherein $R_2$ is selected from the group consisting of hydrogen, aromatic and alicyclic radicals and alkyl and substituted alkyl radicals containing less than 11 carbon atoms, to obtain the corresponding cyclic carbonate having the formula

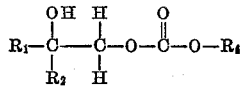

wherein the substituents $R_1$ and $R_2$ are as hereinbefore described, and wherein $R_4$ is an alkyl radical containing less than 5 carbon atoms, and subjecting such acyclic carbonate to ammonolysis in an aqueous medium with a water-soluble ammonia or a primary or secondary amine having the formula $NH(R_5)_2$ in which $R_5$ is hydrogen or an alkyl radical containing less than 4 carbon atoms, or mixtures thereof, to obtain the corresponding monocarbamate having the formula

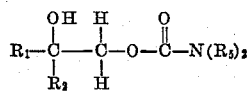

wherein the substituents $R_1$, $R_2$, and $R_5$ are as hereinbefore described. Better results are obtained when in the foregoing formulae $R_2$ is hydrogen or a phenyl radical, and especially desirable results are to be achieved when in such formulae, $R_1$ is a phenyl radical and $R_2$ is hydrogen. For the purposes of this invention, the term "glycol" refers to a diatomic alcohol of the aliphatic series in which the two hydroxyl groups are attached to adjacent carbon atoms, and "1,2 glycol" refers to a glycol in which one of such hydroxyl groups is primary, i.e. a —$CH_2OH$ group, and the other hydroxyl group is secondary, i.e. a —CHOH group.

Once the specific reactions and particular sequence of steps disclosed herein are appreciated, it will be apparent to those skilled in the art that the classes of the reactant compounds have been selected on the basis of requirements for such specific reactions and particular sequence of steps, and that the variety of substituents which may be attached to the reactive groups in such reactant compounds are of an appropriate scope in view of the teachings of the art.

Thus, the halo-formic ester employed in this process may be a chlorine, bromine or fluorine derivative of an alkyl ester of formic acid, in which the alkyl radical of such ester may be a methyl, ethyl, propyl or butyl radical.

Also, the water-soluble amine employed in the ammonolysis reaction of this process may be ammonia, a primary or secondary, mono or polyamine, or a heterocyclic compound. Some of the amines which may be employed as reactants in this ammonolysis reaction are such primary monoamines as methyl, ethyl and propyl amines; and such primary diamines as methylene diamine, ethylene diamine and propylene diamine. Also, some examples of secondary amines are such secondary monoamines as dimethyl amine, diethyl amine, dipropyl amine, methylethyl amine, methylpropyl amine, and such secondary diamines as N-methyl, N'-methyl diamino methane; N-methyl, N'-ethyl diamino methane; N-methyl, N'-propyl diamino methane; N-methyl, N'-methyl 1,2-diamino ethane; N-methyl, N'-ethyl 1,2-diamino ethane; N-methyl, N'-propyl 1,2-diamino ethane; N-methyl, N'-methyl 1,2-diamino propane; N-methyl, N'-ethyl 1,2-diamino propane; N-methyl, N'-ethyl 1,3-diamino propane; N-ethyl, N'-ethyl 1,3-diamino methane and N-propyl, N'-propyl 1,3-diamino methane. Further, this reactant may be a heterocyclic amino compound, such as piperazine, morpholine, imidazole, indol, purines, pyrimidines, piperidine, pipecoline and phthalimidine.

The alcohol employed in the condensation reaction of this process may be, for example, 2-phenylethanol, 2,2-diphenylethanol, 3-phenylpropanol, 4-phenyl-3-butanol, 8-phenyl-7-octanol, propanol, heptanol, decanol, 3-nonanol, 7-pentadecanol, 9-phenyl-8-heptadecanol, 2-phenyl, 2-piperazinoethanol, 7-piperidyl-6-duodecanol, 3-phenyl, 3-cyclopentanyl-2-propanol, 2-benzol, 2-octylethanol, 7-benzol and 7-morpholino-6-heptanol. In particular, some of the glycol reactants suitable for employment in this process are styrene glycol, 2-phenyl-1,2-ethanediol, 2,2-diphenyl-1,2-ethanediol, 3-phenyl-1,3-propanediol, 3,3-diphenyl-1,3-propanediol, 4-phenyl-3,4-butanediol, 4,4-diphenyl-3,4-butanediol, 8-phenyl-7,8-octanediol, 8,8-diphenyl-7,8-octanediol, 1,2-propanediol, 1,2-heptanediol, 1,2-decanediol, and 2-phenyl, 2-morpholino-1,2-ethanediol.

The process of this invention may be carried out by dissolving the glycol, e.g. styrene glycol, in a suitable solvent, e.g. benzene, then combining with the resulting solution the haloaliphatic ester, e.g., ethylchloroformate, then heating the resulting mixture to a temperature at which condensation of the reactants is obtained, about 115° F., to form the corresponding acyclic carbonate, e.g. 2-phenyl-2-hydroxyethyl-ethylcarbonate. The temperature of the reatcion varies according to variations in the reactants, but generally temperatures between 20° F. and 200° F. may be used.

There is included in the condensation reaction mixture an organic base, e.g. pyridine, to neutralize the halogen acid, e.g. hydrochloric acid, formed in the condensation reaction. After the condensation reaction has been completed, this organic base may be separated from the reaction mixture by acidification to a pH of about 2.0 with, for example, sulfuric acid, and then separating the resulting organic solvent phase of the resulting solvent mixture from the aqueous phase thereof. The separated organic solvent phase is subjected to ammonolysis, in an aqueous medium, with the water-soluble amine, e.g. aqueous ammonia. After heating the reaction mixture at a temperature conducive to the ammonolysis reaction, about 85–90° F., for a period of time sufficient to allow for completion thereof, the aqueous phase of such reaction mixture is separated from the organic solvent phase thereof. The appropriate separated phase can then be concentrated to obtain a suspension of the corresponding monocarbamate, and upon standing there may be obtianed crystals of such monocarbamate, e.g. 2-hydroxy-2-phenylethyl carbamate.

This invention can be further illustrated by the following specific examples:

*Example I*

2-hydroxy-2-phenylethyl carbamate was prepared by the following method:

Styrene glycol (1-phenyl-1,2-ethanediol) in the amount of 4.5 kgs., was dissolved in a mixture of 5.3 l. of pyridine and 33 l. of benzene. To the resulting solution, in a glass-lined reactor, there was added, at a temperature of 75° F., 3.7 l. of ethylchloroformate, slowly, with agitation and with external cooling. After the addition had been completed, the reaction mixture was heated to a temperature of 115° F., and maintained at such temperature for a period of one hour. Thereupon the reaction mixture was stored overnight at room temperature.

Then, the reaction mixture was cooled to a temperature of 40° F. and acidified to a pH of about 2 with approximately 550 ml. of concentrated sulfuric acid in 16.5 l. of cold distilled water, while maintaining such reaction mixture under agitation. The aqueous phase of the resulting reaction mixture was separated from the benzene phase thereof, and the separated benzene solution was washed with 4 l. of cold water containing 50 cc. of sulfuric acid. Then, the benzene solution was washed with an additional 4 l. of cold water.

The ammonolysis reaction was carried out by combining with the benzene solution derived from the foregoing step 30 l. of a 28% aqueous ammonia solution, and then agitating the resulting mixture at a temperature of 85–90° F. for a period of one hour. Thereupon, the aqueous ammonia phase of such mixture was separated from the benzene phase thereof, and the separated benzene solution was re-extracted with 10 l. of aqueous ammonia at a temperature of 85–90° F. for a period of 15 minutes. The separated aqueous ammonia solutions were combined and distilled at a reduced pressure until there was obtained a pot temperature of 115° F. at a vacuum of 27 inches. At this time, the volume of the aqueous solution had been reduced to approximately 22–27 l. This concentrated solution was cooled to 35° F. by storage at a temperature of 32° F. overnight to obtain crystals of the corresponding monocarbamate.

The thick aqueous suspension thereupon was filtered and the crystals were washed with ice cold distilled water until freed from ammonia. The mother liquor was concentrated from a volume of about 33 l. to 20 l. by distillation, and a second crop of crystals was thereupon obtained.

The crop of crystals first obtained weighed 3.29 kg. and demonstrated a melting point of 111–113.5° F., while the second crop of crystals weighed .36 kg. and demonstrated a melting point of 109–112° F. Thus, there was obtained a total yield of 2-hydroxy-2-phenylethyl carbamate crystals of 3.65 kg., which approximated a 61.8% yield based on the amount of styrene glycol employed in reaction.

In a re-crystallization process, the 3.65 kg. of crystals were dissolved in about 18 l. of water at a temperature of 85° C., and such solution was treated with a mixture of 60 g. of Norite A charcoal and 60 g. of Supercel (diatomaceous earth) filter aid, then filtered and cooled to a temperature of 15° C. After cooling, the crystals which formed were filtered and washed; then vacuum dried at a temperature of 110° F. The yield of dry product was 3.27 kg., which was equivalent to a 55.5% yield based on the amount of styrene glycol employed in the reaction, and demonstrated a melting point of 111.5–113.5° F.

*Example II*

2,2-diphenyl-2-hydroxyethyl-N-dimethyl carbamate was prepared by the following method:

1.7 kilos of 1,1-diphenyl glycol was dissolved in 10 l. of benzene and 1.25 l. of pyridine. At a temperature of 75° F., .89 l. of ethyl chloroformate was added with agitation at such a rate that the temperature did not go above 95° F. After the addition the reaction was maintained at a temperature of 110–115° F. for one hour. On completion of the heating period the reaction was cooled to 40° F. and then 8.0 l. of water at 40° F. was added. The solution mixed, settled and separated. The organic layer was then extracted with 8 l. of water containing 240 cc. of concentration $H_2SO_4$ at a temperature of 40° F., mixed, settled and separated. A water wash of 4.0 l. of cold water was done and the aqueous layer separated as before.

To the organic phase was added 7.9 l. of 40% dimethyl amine and mixed for one hour at 85° F., settled, and then separated. The aqueous phase was washed with 1 l. of benzene 3 times. The combined benzene solutions were washed with 2 l. of water and the water discarded. The separated organic layer was vacuum distilled to remove the traces of water by the distillation of 1 gallon of the benzene, cooled to 40° F. overnight with agitation and then filtered and washed with cold benzene. The filtrate was dried with vacuum at 125° F. and concentrated to about ⅓ the volume to take off another crop; and then a third crop as before.

1st crop, 1465 gm., M.P. 128–129° C.
2nd crop, 250 gm., M.P. 105–110° C.
3rd crop, 140 gm., M.P. 105–110° C.

The second and third crop were recrystallized from isopropanol to give 225 gm., melting point of 134–135° C.

The first crop and the purified 2nd and 3rd crop were recrystallized from 8 l. of boiling acetone, filtered and then precipitated with the slow addition of 8 l. of water to the hot solution, which was finally cooled to 15° C. The crystals were filtered and then washed with 60% aqueous acetone, air dried and then vacuum dried. The yield of dried product was 1570 gms. which is equivalent to a 66.4% yield based on the amount of glycol used in the reaction. The dried product had a melting point of 134–135°.

*Example III*

2-phenyl-2-hydroxy-butyl carbamate was prepared by the following method:

49.81 gms. of 2-phenyl-1,2-butanediol and 25.01 gms. of pyridine were dissolved in 500 ml. of benzene and cooled to 5° C. 34.01 gm. of ethyl chloroformate was added over a period of ¾ hour at 4–8° C. The reaction mixture was warmed to room temperature and stirred for 2 hours and then extracted with 100 cc. each of the following:

Water, 15% hydrochloric acid, 10% sodium bicarbonate and finally water. The solvent was stripped off. The residual oil was mixed with 300 ml. of 28% aqueous ammonia for 1 hour. The ammonia and water were vacuum distilled at a temperature of 40° C. or less. Then 300 cc. of carbon tetrachloride was added and the solution dried with sodium sulfate. The solution was cooled at 0° C. and then filtered. The crystals were washed with cold carbon tetrachloride and vacuum dried. The yield was 57 gms. of dried product having a melting point of 55–56.5° C.

*Example IV*

A preparation of 9(9-hydroxy-fluoryl) methyl carbamate was prepared by the following method:

21.3 gms. of 9-hydroxy, 9-hydroxy methyl fluorene was dissolved in 500 cc. of benzene with 12 gms. of pyridine. To the above reaction mixture was added 12.0 gms. of ethyl chloroformate over a period of ½ hour at 10° C. with agitation. After the addition is completed the temperature is raised to 30° C. for two hours. The mixture is cooled to 5° C. and shaken with 200 cc. of water containing sufficient sulfuric acid to bring the pH of the aqueous to 2, then washed with 10 cc. of water. The benzene solution was mixed with 200 cc. of 28% ammonia for one hour at 28° C. The benzene solution was separated and washed with 50 cc. of water. Twenty-five cc. of benzene was distilled and the solution cooled to 5° C. Crystals were obtained and then filtered and washed with cold benzene yield 15 g.

While in the foregoing specification various embodiments of this invention have been set forth and specific details thereof elaborated for purposes of illustration, it will be apparent to those skilled in the art that this invention is susceptible to other embodiments and that many of these details can be varied widely without departing from the basic concept and spirit of the invention.

We claim:

1. In a method for preparing 2-hydroxy-2-phenylethyl carbamate, the steps of condensing styrene glycol and ethylchloroformate to obtain 2-phenyl-2-hydroxyethyl-ethyl carbonate, and subjecting said 2-phenyl-2-hydroxyethyl-ethyl carbonate to ammonolysis with ammonia in an aqueous medium to obtain said 2-hydroxy-2-phenylethyl carbamate.

2. In a method for preparing 2,2-diphenyl-2-hydroxyethyl-N-dimethyl carbamate, the steps of condensing 1,1-diphenyl glycol and ethylchloroformate to obtain 2,2-diphenyl-2-hydroxyethyl-ethyl carbonate, and subjecting said 2,2-diphenyl-2-hydroxyethyl-ethyl-carbonate to ammonolysis in an aqueous medium with dimethyl amine to obtain said 2,2-diphenyl-2-hydroxyethyl-N-dimethyl carbamate.

3. In a method for preparing 2-phenyl-2-hydroxybutyl carbamate, the steps of condensing 2-phenyl-1,2-butanediol and ethylchloroformate to obtain 2-phenyl-2-hydroxybutyl-ethyl carbonate, and subjecting said 2-phenyl-2-hydroxybutyl-ethyl carbonate to ammonolysis in an aqueous medium with ammonia to obtain said 2-phenyl-2-hydroxy-butyl carbamate.

4. In a method for preparing 9 (9-hydroxy-fluoryl) methyl carbamate, the steps of condensing 9-hydroxymethyl fluorene and ethylchloroformate to obtain 9 (9-hydroxy fluoryl) methyl-ethyl carbonate, and subjecting said carbonate to ammonolysis in an aqueous medium with ammonia to obtain said 9 (9-hydroxy-fluoryl) methyl carbamate.

5. In a method for preparing organic carbamate compounds wherein a 1,2-glycol having the formula

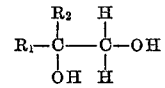

in which $R_1$ is an aromatic radical and in which $R_2$ is selected from the group consisting of hydrogen and aromatic radicals is converted to the corresponding carbonate, and wherein said carbonate is subjected to ammonolysis with a water-soluble compound selected from the group consisting of ammonia and amines containing at least one available hydrogen atom attached to the nitrogen atom to obtain the corresponding carbamate, the steps of condensing said 1,2-glycol with a halo-formic ester having the formula

in which X is a halogen selected from the group consisting of chlorine, fluorine and bromine and in which $R_5$ is an alkyl radical containing less than five carbon atoms to obtain an acyclic carbonate having the formula

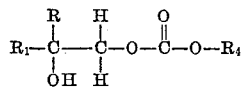

in which $R_1$, $R_2$ and $R_4$ have the same meaning as previously defined, and subjecting said acyclic carbonate to ammonolysis to obtain the corresponding monocarbamate.

References Cited in the file of this patent
UNITED STATES PATENTS

| | | |
|---|---|---|
| 2,627,524 | Malkemus | Feb. 3, 1953 |
| 2,802,022 | Groszos et al. | Aug. 6, 1957 |
| 2,871,259 | Levy | Jan. 27, 1959 |
| 2,967,880 | Finke et al. | Jan. 10, 1961 |